(12) United States Patent
Gordon et al.

(10) Patent No.: US 6,711,593 B1
(45) Date of Patent: Mar. 23, 2004

(54) SYSTEM AND METHOD FOR LIVE UPDATE OF A MANUFACTURING SYSTEM

(75) Inventors: Brian S. Gordon, San Jose, CA (US); Dale C. Quantz, San Jose, CA (US); David R. Preston, Los Gatos, CA (US)

(73) Assignee: Camstar Systems, Inc., Campbell, CA (US)

( * ) Notice: Subject to any disclaimer, the term of this patent is extended or adjusted under 35 U.S.C. 154(b) by 264 days.

(21) Appl. No.: 09/892,873

(22) Filed: Jun. 26, 2001

Related U.S. Application Data

(60) Provisional application No. 60/214,060, filed on Jun. 26, 2000.

(51) Int. Cl.⁷ ............................................. G06F 17/30
(52) U.S. Cl. ...................................... 707/204; 707/203
(58) Field of Search ................................ 707/204, 203, 707/202, 201, 200, 10, 1; 700/95; 713/100; 709/224

(56) References Cited

U.S. PATENT DOCUMENTS

| | | | | |
|---|---|---|---|---|
| 5,777,876 A | * | 7/1998 | Beauchesne | 700/95 |
| 5,826,252 A | * | 10/1998 | Wolters et al. | 707/1 |
| 5,953,725 A | * | 9/1999 | Eprahim et al. | 707/103 R |
| 6,247,128 B1 | * | 6/2001 | Fisher et al. | 713/100 |
| 6,343,360 B1 | * | 1/2002 | Feinleib | 713/1 |
| 6,505,248 B1 | * | 1/2003 | Casper et al. | 709/224 |
| 6,560,604 B1 | * | 5/2003 | Fascenda | 707/10 |
| 6,564,216 B2 | * | 5/2003 | Waters | 707/10 |

\* cited by examiner

*Primary Examiner*—Sanjiv Shah
(74) *Attorney, Agent, or Firm*—Wagner, Murabito & Hao LLP

(57) ABSTRACT

A method and system for performing a live update of a manufacturing database. The user can automatically change database tables, add files, executable programs, and new modeling schema at remote sites from a central location. Manufacturing processes can be modified or changed entirely to introduce a new product line. Clients at the remote sites receive notification that a change in the database will occur so that works in progress can be completed. Clients complete their transactions but connections to the application server are maintained to facilitate resuming production. No new transactions are allowed at the remote site while the update is in progress. Downtime is minimal as the system is always running and the user can schedule the update at the most convenient time for individual sites. A rollback copy of the data is maintained to allow users to return to a version utilized prior to the last update.

18 Claims, 14 Drawing Sheets

300

UpdateControl Table

| Field | Value | Description |
|---|---|---|
| Version[1] | Number | The current version you rare propagating; or if doing a rollback, the version you are rolling back |
| SiteID | Text | Site's SiteID, usually the computer name |
| UpdateNow | Boolean | 0 to ignore ScheduleUpdate and do an update now. Mutually exclusive with RollBackNow. |
| RollbackNow | Boolean | 0 to ignore ScheduleUpdate and do a rollback now. Mutually exclusive with UpdateNow. |
| ScheduledUpdate | Date and time | Specified date and time. No provision for scheduled rollbacks. |
| SuspendTime | Number in milliseconds | Duration between "No new transactions but allow current" and "Drop all Clients." |
| WIPColumnChangeAllowed | Boolean | Set to 0. For future use. |
| BackUpDataSource | Text | ODBC name of the SiteBackup database |
| Userid | Text | Valid user for the BackupDataSource |
| Password | Text | Valid password for the Userid on BackupdataSource |
| PreviousVersion[2] | Number | The version from the last LiveUpdate; or if doing a rollback, this is the version your are rolling back to |
| BackupDirectory | Text (URL format) | Directory for backing up file updates. Backed up tables are stored in the SiteBackup database. Backed up files stay here. |

1. Primary key is Version and SiteID.
2. Update is not valid if the site version is not currently at PreviousVersion.

FIGURE 8A

UpdateDetails Table

| Field | Value | Description |
|---|---|---|
| Version[1] | Number | The version propagated by the LiveUpdate |
| Operation | Text | |
| DetailType | Text (Table, File, or Execution) | Indicates whether the change was a Table, File, or execution |
| EntityName | Text (TableName or FileName) | The actual name of the table, file or execution |
| Path | Text | The path to the entities that changed. |

1. Primary key is Version, Operation, DetailType, and EntityName.

FIGURE 8B

LocalControl Table

| Field | Value |
|---|---|
| Version[1] | Number |
| Status | Text |

1. Primary key is Version.

FIGURE 9

UpdateFeedback

| Field | Value |
|---|---|
| SiteID[1] | Text |
| Version | Number |
| Sequence | Int |
| Error string | Text |
| EndTime | Date and time |
| Status | Text (Mismatch between site version and previous version. Update Failed, Rollback failed. Check the version of the update, or Check the rollback version) |

1. Primary key is SiteID and Version.

FIGURE 10

CONTROL DETAILS TABLE

| VERSION | SEQUENCE | DETAIL TYPE | ENTITY NAME | TABLE TYPE |
|---------|----------|-------------|-------------|------------|
|         |          |             |             |            |
|         |          |             |             |            |
|         |          |             |             |            |
|         |          |             |             |            |
|         |          |             |             |            |
|         |          |             |             |            |

FIGURE 11A

ControlDetails Table

| Field | Value | Description |
|---|---|---|
| Version[1] | Number | The version you are propagating |
| Sequence | Number | A unique, arbitrary number |
| DetailType | Text (Table, File, or Execution) | If Table, LiveUpdate inserts. If File or Execution, the customer must insert. |
| EntityName | Text (Path to TableName or FileName) | The destination of what is copied from the source directory. For example:<br>C:\Files\MyNewFiles\NewFile.ocx |
| TableType | Char | M = metadata<br>I = Instance data<br>TableType is ignored for File or Execution entries. |

1. Primary key is Version and Sequence.

FIGURE 11B

VersionInfo Table

| Field | Value |
|---|---|
| Version[1] | Number |
| BackUpDataSource | Text |
| Userid | Text |
| Password | Text |
| BackupDirectory | Text (URL format); the back up directory for files and executions |

FIGURE 12

SYSTEM AND METHOD FOR LIVE UPDATE OF A MANUFACTURING SYSTEM

RELATED APPLICATIONS

This application claims the benefit of U.S. Patent Provisional Application Ser. No. 60/214,060, filed Jun. 26, 2000, entitled "IN-SITE LIVE UPDATE" which is hereby incorporated by reference.

BACKGROUND OF THE INVENTION

1. Field of the Invention

The present invention relates to data management systems. More specifically, the present invention pertains to a method and system for performing automated configuration of remote manufacturing databases.

2. Prior Art

Currently, many manufacturers use mechanized assembly lines to produce a variety of products. Computers often perform important functions in the operations of these assembly lines, including storing and processing instructions which regulate activities on the assembly line. The computers are typically arranged in a network and cooperatively operate in the performance of the manufacturing activities. A typical network includes a server which stores instructions and is connected via the network to clients which perform the instructions. The clients are typically a variety of devices (e.g., robotic devices) capable of performing numerous manufacturing tasks (such as heating, drilling, cutting, painting, moving, coupling, fabricating, etc.) associated with producing an object. Mechanized assembly lines utilizing networked server and client computers usually provide numerous beneficial advantages. However, significant resources are typically required to maintain and update information utilized by the networked server and client computers in the performance of the manufacturing operations.

Manufacturers are often required to re-configure the information (e.g., instructions) on the servers for a variety of reasons. The server information often requires changes in response to last-minute alterations and varying production requirements. There could be a last minute change to an item design before it is put into production, or perhaps an entirely new product line is introduced at a factory. Product flow information that provides precise business metrics concerning inventory and delivery scheduling tracked during the manufacturing process may indicate changes in the server information are appropriate. Sometimes, a more efficient method of producing an item necessitates an alteration of the server information. There are usually numerous reasons why it is desirable to change at least a portion of diverse server information typically utilized in most manufacturing operations.

There are numerous different types of mechanized assembly lines and different server information utilized in the manufacturing operations. Many manufacturers use programs that are hard coded and must be compiled before sending the instructions to the clients. Sometimes, data driven systems in which object oriented programming are utilized to control the manufacturing process. One such system includes a server database which contains the logical data for the manufacturing plant. Standardized production models can be implemented in multi-site environments, or individual models can be created to address the unique processes and manufacturing styles of each plant.

Whatever computer software architecture is used, manufacturers typically have to stop production at the plant while updates are loaded into the server. Depending on the amount of information requiring updating and method used to update the information, a plant could be shut down for hours or days while the updates are being implemented. For most manufacturers shut-downs involve a significant waste of resources. Typically, significant resources are expended preparing for a shut-down such as scheduling, coordinating, checking equipment, putting machines in an appropriate configuration for shutdown, etc. When the plant is shut down the manufacturing facility is not producing items and is essentially sitting idle. During a startup, significant resources are again expended preparing for the startup including testing to ensure the modifications and changes are correct and appropriate, checking safety concerns, putting the equipment in a configuration for startup, etc. These activities are often duplicated efforts that have to be performed repeatedly for similar assembly lines (maybe in different plants) by multiple manufacturing teams with significant levels of expertise in manufacturing processes and computer systems, a relatively rare characteristic.

It is important to the manufacturer that the system for updating the server information configurations are reliable. During server information updates data is often lost or corrupted, especially in systems where duplicative human input is required. A small programming error could have a disastrous effect on the final product and finding and fixing the error could take longer than implementing the update itself. Therefore, verification of successful updates is desirable as well as having a fault tolerant method of implementing these updates. Also, sometimes manufacturers may find it necessary to revert to a previous production model. The update may not have worked as well as anticipated.

Accordingly, the need exists for a method of accurately and efficiently updating remote manufacturing databases. It is also desirable that these updates are completed quickly to reduce the amount of downtime for the manufacturing system. The system should be fault tolerant and preferably verification to the update should be provided in detail. Finally, allowances should be provided for a previous version of the database to be reverted to if necessary.

SUMMARY OF THE INVENTION

The present invention provides a method of automatically updating remote manufacturing databases from a central location. It performs these updates quickly (e.g., live), thus reducing the amount of downtime for the manufacturing system. The system is fault tolerant and verification of the update is provided in detail. The present invention allows a user to rollback to a previous version of the database if necessary.

The present invention provides a method and system for performing an in-situ live update of a manufacturing database. In one embodiment, the user can automatically change database tables, add files, executable programs, and new modeling schema at remote sites from a central location. Manufacturing processes can be modified or changed entirely to introduce a new product line. Clients at the remote sites receive notification that a change in the database will occur. Clients are given a predetermined interval of time to complete their transactions and no new transactions are allowed to begin. Initial update processing is performed while the existing transactions are proceeding. After the predetermined time, transaction processing is suspended while the final steps of the update are in progress, but connections to the application server are maintained to facilitate production resumption. The present invention minimizes production downtime as the system is always running and the user can schedule the update at the most convenient time for individual sites. A rollback copy of the data is maintained to allow users to return to a version utilized prior to the last update.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 8A is an exemplary Update Control table used in accordance with one embodiment of the present invention.

FIG. 8B is an exemplary Update Details table used in accordance with one embodiment of the present invention.

FIG. 9 is an exemplary Local Control table used in accordance with one embodiment of the present invention.

FIG. 10 is an exemplary Update Feedback table used in accordance with one embodiment of the present invention.

FIG. 11A is an exemplary control details table used in accordance with one embodiment of the present invention.

FIG. 11B is a table showing the variables included in an exemplary control details table used in accordance with one embodiment of the present invention.

FIG. 12 is one embodiment of a version information table provided in the present invention to keep track of previous versions that have been run and the data source to use for the roll back operations.

DETAILED DESCRIPTION

A method and system for performing a live update of a manufacturing database is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "importing", "exporting", "initiating", "deleting", "copying", "waiting", "synchronizing", "running", and "reloading", or the like, can refer to the actions and processes (e.g., process 100 of FIG. 1) of a computer system or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices.

Figure 1:
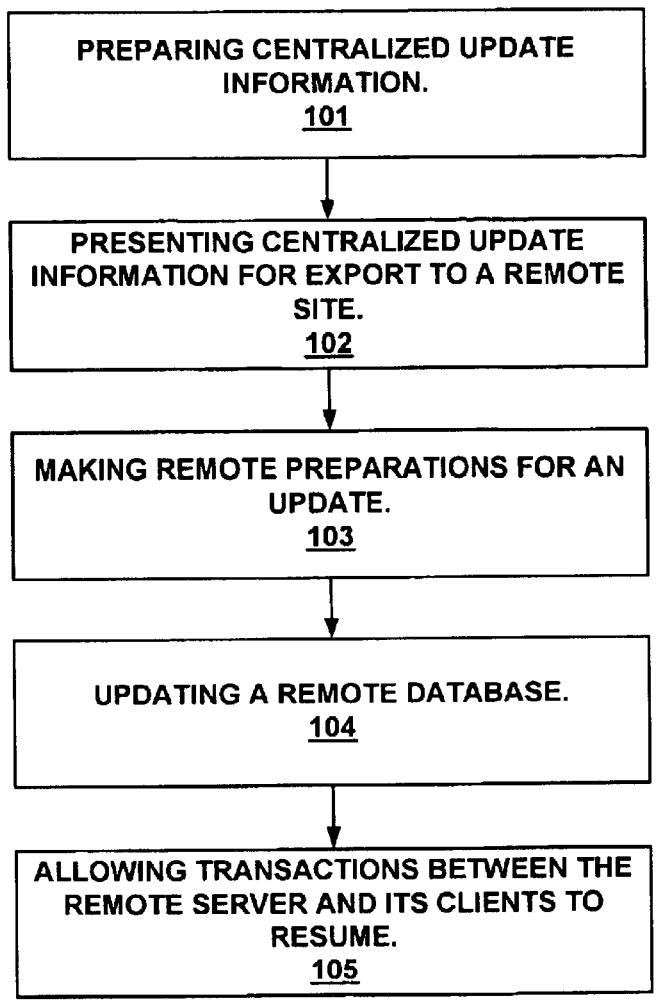
FIG. 1 is a flowchart showing a sequence 100 for updating a remote database in accordance with one embodiment of the present invention.

FIG. 1 is a flow chart of automated remote database configuration method 100, one embodiment of the present invention. In one embodiment of the present invention, automated remote database configuration method 100 assists automated live updates of information associated with a remote server database. The live update activities of a present invention automated remote database configuration method enables efficient database alteration activities and facilitates minimization of disruptions. For example, in one exemplary implementation the present invention is utilized to update a remote database utilized in manufacturing operations. In one embodiment of the present invention, a central database server is provided and stores information associated with manufacturing operations including modeling data and data instances which control the manufacturing processes at a remote site (e.g., a manufacturing plant). Changes to the central database are automatically propagated to remote servers in a coordinated and efficient process.

In step 101 of automated remote database configuration method 100, configuration of a central database is facilitated (e.g., at a headquarters location) and centralized update information is prepared. There are a variety of activities that may be included in configuring a central database and preparing centralized update information, including providing new information, changing previous information, deleting information, etc. In one object oriented database server system, centralized update information includes configuration data which defines objects and modeling data associated with a manufacturing operation work flow. In one embodiment of the present invention, preparing centralized update information includes automatically providing a copy of the database before any changes are made, determining the differences in a database before the changes are made and after the changes are made, and consolidating various information for export. In one embodiment of the present invention, a central database update process is utilized in the configuration and preparation of the centralized update information.

In one exemplary implementation of the present invention, the updated information is related to manufacturing operations at a remote manufacturing facility. The updated information may include metadata (e.g., instance data schema) security data (e.g., permission data, etc.), changes to business logic (e.g., executions), modeling data (e.g., workflows, operations, products, etc.), version data and other files such as dynamic library links (DLLs) and object linking and embedding control extensions (OCXs).

In step 102 of FIG. 1, the centralized update information prepared in step 101 is exported to a remote site (e.g., a server at a manufacturing plant). There are a variety of ways in which the centralized update information is exported. In one embodiment, exporting the centralized update information includes communicating the information to a remote site (e.g., via a network). In one embodiment of the present invention, the centralized update information is presented for communication to the remote site and another system or method communicates the information from the central location to the remote site.

Remote preparations for an update are made in step 103, including performing initial remote update processing while permitting existing transactions between a remote server and its clients to continue. In one embodiment of the present invention, a hold state is initiated that permits existing transactions to continue (e.g., for a specified period of time) but prevents new transactions from beginning. In one embodiment of the present invention, initial remote update processing includes importing live update control tables and polling the control tables for insertion of an update control record that indicates initiation of a live update process. "Changed" files that are imported are copied to a remote site update source directory. In one exemplary implementation of the present invention a remote update process is initiated.

In step 104 of FIG. 1, the manufacturing database at the remote site is updated with the configuration information developed in step 101 without disconnecting a remote server form its clients. In one embodiment of the present invention, remote server and client transactions are suspended (e.g., at a time specified in step 103). The suspension of transactions between the server and its clients facilitates coherency maintenance during the database update process (e.g., during changes to remote server manufacturing database). In one exemplary implementation, the remote site update is not performed until existing transactions are completed. The updated configuration information can impact manufacturing operations in a variety of ways including the introduction of new steps into the previous manufacturing process, creation of an entirely new manufacturing process, or reversion of the manufacturing process to an earlier configuration. In one embodiment of the present invention, a remote update process is completed.

In step 105 transactions between the remote server and its clients are allowed to resume. In one embodiment of the present invention, transactions are resumed based upon the changed information. In one exemplary implementation of the present invention, measures are taken to ensure the changes were made properly before permitting the transactions resume.

Figure 2:
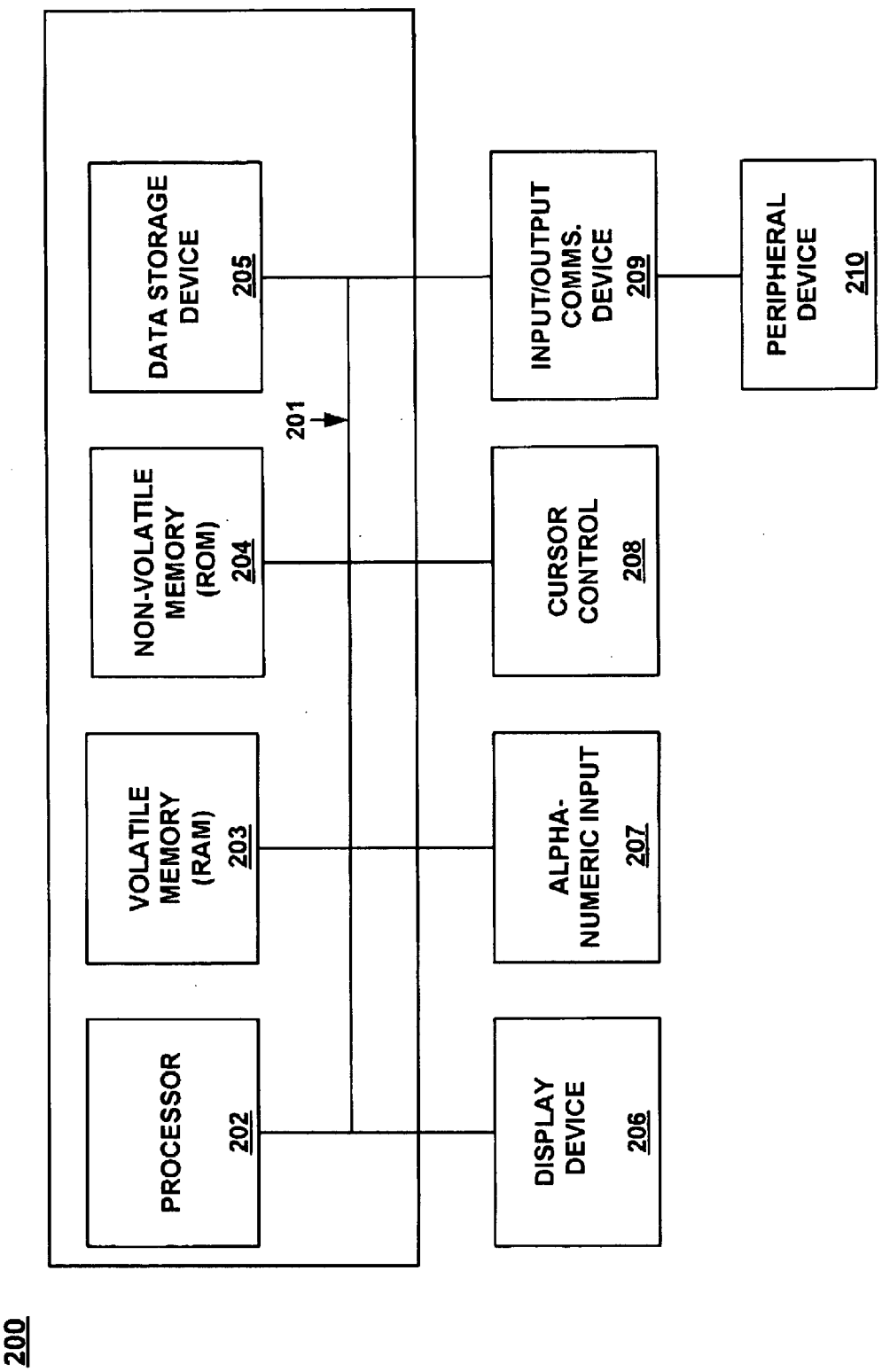
FIG. 2 is a block diagram of an exemplary computer system upon which embodiments of the present invention may be practiced.

With reference to FIG. 2, portions of the present invention are comprised of computer-readable and computer-executable instructions that reside, for example, in computer system 200 which is used as a part of a general purpose computer network (not shown). It is appreciated that computer system 200 of FIG. 2 is exemplary only and that the present invention can operate within a number of different computer systems including general-purpose computer systems, embedded computer systems, laptop computer systems, hand-held computer systems, and stand-alone computer systems.

In the present embodiment, computer system 200 includes an address/data bus 201, a central processor unit (CPU) 202, a volatile main memory 203, and a non-volatile read only memory (ROM) 204. Address/data bus 201 conveys digital information between the various components. Central processor unit (CPU) 202 processes digital information and instructions. Volatile main memory 203 comprises volatile random access memory (RAM) for storing digital information and instructions such as automated manufacturing data and instructions for updating remote manufacturing databases, and on-volatile read only memory (ROM) 204 for stores information and instructions of a more permanent nature. In addition, computer system 200 may also include a data storage device 205 (e.g., a magnetic, optical, floppy, or tape drive or the like) for storing vast amounts of data such as manufacturing databases. It should be noted that the software program for performing the database updating process of the present invention can be stored either in volatile memory 203, data storage device 205, or in an external storage device (not shown).

Devices which are optionally coupled to computer system 200 include a display device 206 for displaying information to a computer user, an alpha-numeric input device 207 (e.g., a keyboard), and a cursor control device 208 (e.g., mouse, trackball, light pen, etc.) for inputting data, selections, updates, etc. Computer system 200 can also include a mechanism for emitting an audible signal (not shown). Furthermore, computer system 200 can include an input/output (I/O) signal unit (e.g., interface) 209 for interfacing with a peripheral device 210 (e.g., a computer network, modem, mass storage device, etc.). Accordingly, computer system 200 may be coupled in a network, such as a client/server environment, whereby a number of clients (workstations, terminals, robots, etc.) are used to run processes for performing desired tasks (e.g., fabrication, assembly etc.). In particular, computer system 200 can be coupled in a system for the delivery of data defined by a manufacturing database.

Figure 3:
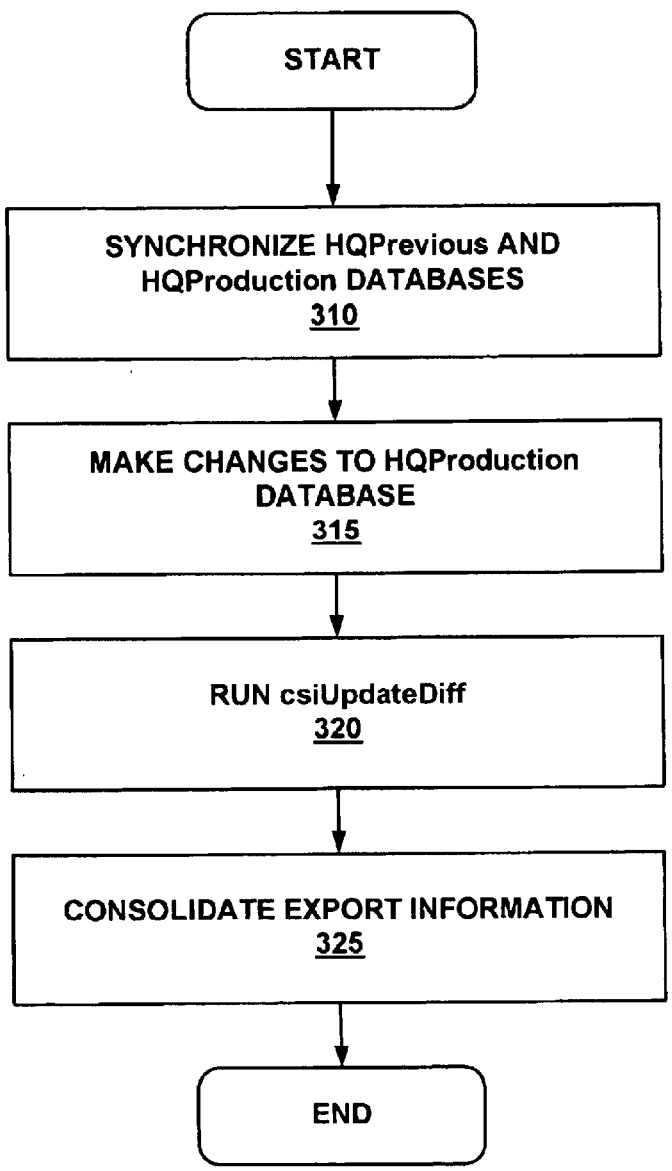
FIG. 3 is a block diagram showing the steps involved at a central (e.g., headquarters) location when a manufacturing database update is initiated in accordance with one embodiment of the present invention

FIG. 3 is a flow chart diagram of a central database update process 300, one embodiment of a central database update process utilized in step 101 of FIG. 1. In one exemplary implementation of the present invention, central database update process 300 is performed at a central location (e.g., a headquarters location). As described below, in one exemplary implementation central database update process 300 includes changing and storing information associated manufacturing operations. There are a variety of activities that may be included in configuring a central database, including providing new information, changing previous information, deleting information, etc.

In step 310 the central previous (e.g., HQPrevious) and central production (e.g., HQProduction) databases are synchronized. A previous database is utilized to store information associated with a previous version of a database (e.g., a version that is not currently being changed). A production database is utilized to implement the current changes. In one exemplary implementation of the present invention, a copy of HQProduction database is made and labeled HQPrevious database. The HQProduction database is used for centralized maintenance of metadata and modeling data including modeling changes. These databases are compared and the changed databases sent to the remote site.

Changes are made to the central production (e.g., HQProduction) database in step 315. These changes can include modifying security data, version data, metadata such as configurable data objects and configurable logic flows, modeling data such as workflows and steps, production data, files such as DLL's and OCX's, and executable commands. This data can be used to modify an existing process or to implement an entirely new manufacturing process. In one embodiment of the present invention, a common production model can be sent to all of the remote sites managed by the central headquarters. In another embodiment, different models that conform to the unique processes and manufacturing styles of each remote site can be configured.

In step 320 of FIG. 3, an update difference program (e.g., csiUpdateDiff) is run. This program compares the old data in a previous database (e.g., HQPrevious) to the changed data in the production database (e.g., HQProduction) to determine what changes have been made. Rows are inserted into the control details table (e.g., FIG. 11A) by the update difference program (e.g., csiUpdateDiff) for every table that is found to be different in the production database (e.g., HQProduction). The control details table lists the entities that are changed for a particular version of an update. FIG. 11A is an illustration of one exemplary implementation of a control details table and FIG. 11B is an tabular explanation of the components of the control details table. After the update difference program (e.g., csiUpdateDiff) has been run, in one exemplary implementation of the present invention a user is responsible for inserting information associated with files and executable commands that change (e.g., inserting information in the control details table).

With reference to 325 of FIG. 3, consolidation of information for exporting is performed. For example the control details table changes made in step 320 are consolidated with other changed information in a central update database (e.g., HQUpdate). In one exemplary implementation, the HQUpdate database includes all of the control tables needed for the update and the actual changed data tables.

Figure 4:
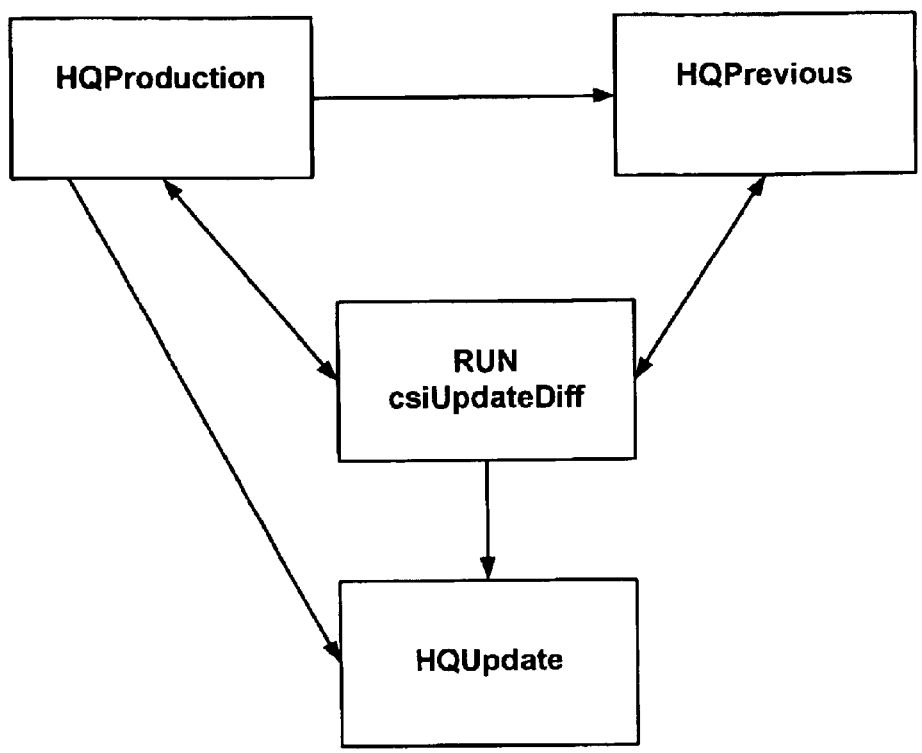
FIG. 4 is a flowchart showing the flow of information occurring at a headquarters site that is initiating a manufacturing database update in accordance with one embodiment of the present invention.

FIG. 4 is a block diagram of the flow of information in one embodiment of central database update process 300. Changes to a manufacturing database are made in a central location and prepared for export to a remote manufacturing site. Facilitating changes in a central location enables manufactures to leverage expertise and resources at one location. Making changes to a central database enables the remote database to stay on line and continue to be productive while initial testing and decisions associated with the changes are made.

Figure 5:
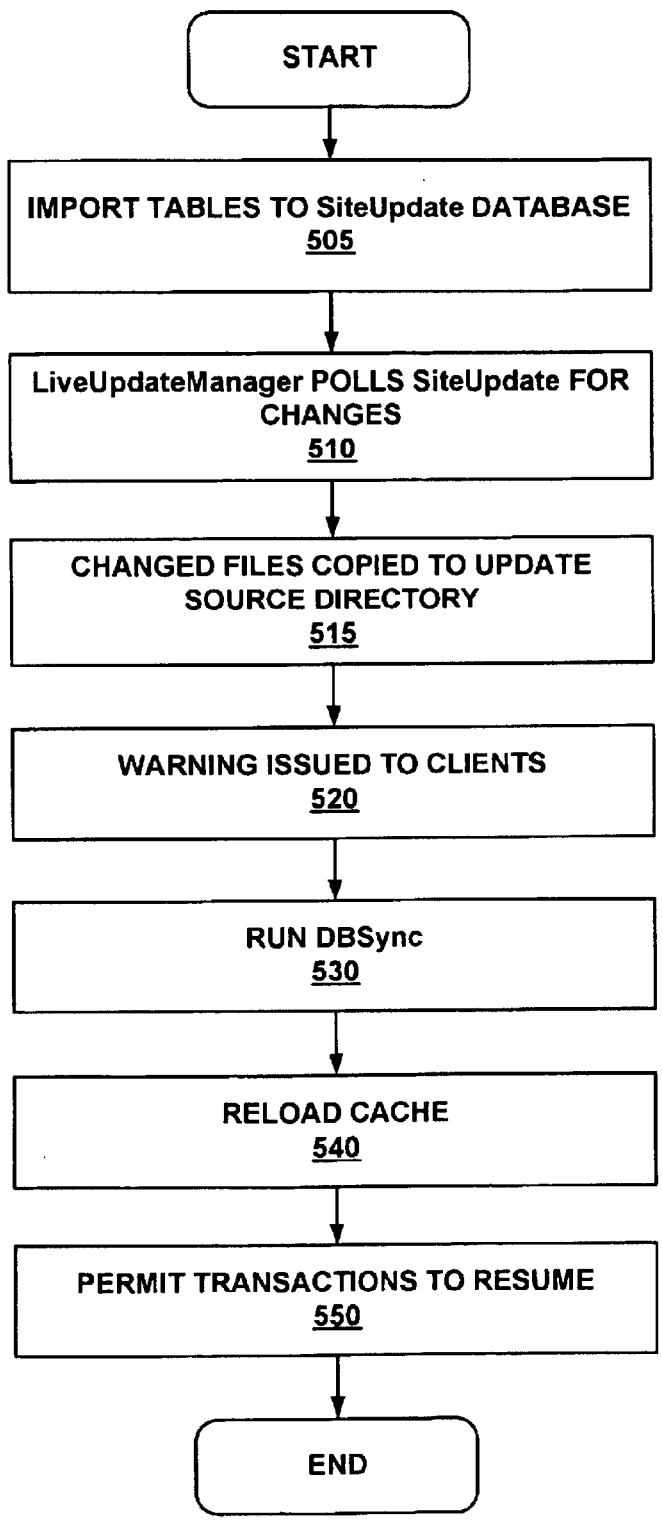
FIG. 5 is a flow chart of a remote database update process included in one embodiment of the present invention.

FIG. 5 is a flow chart of remote database update process 500, one embodiment of a present invention remote database update process. In one embodiment of the present invention, remote database update process 500, performs activities associated with steps 103, 104 and 105 of FIG. 1. FIG. 5 includes the steps involved at a remote location when an update is initiated in accordance with one embodiment of the present invention. As will be described below, the method of the present invention deals with automatically configuring a remote manufacturing database.

With reference to step 505 of FIG. 5, the control tables and data tables are imported into a remote site update (e.g., SiteUpdate) database. In one exemplary implementation of the present invention, these are imported from the central update database (e.g., HQUpdate database) described in step 325 of FIG. 3.

In step 510 of FIG. 5, a remote site update management component (e.g., LiveUpdateManager) polls a site update file for changes in the database version. In one exemplary implementation, the remote site update management component (e.g., LiveUpdateManager) is a program that is running in the background at the remote site and oversees the process of implementing remote updates. In one embodiment, the remote site update management component is directed by a user to check at regular intervals for indications of changes from a central location. For example, the remote site update management component checks for a scheduled update indication or an update now indication in an update control table (e.g., shown in FIG. 8A). If an update now indication is detected in the update control table, the update process at the remote site is triggered, otherwise the update process is triggered at the scheduled update indication time.

In step 515, changed files and data tables are copied to the update source directory. This directory is a user specified path name telling the remote site update management component (e.g., LiveUpdateManager) where to copy the imported files.

In one embodiment of the present invention, warnings are issued to clients in step 520.

With reference to step 530 of FIG. 5, the remote site update management component (e.g., LiveUpdateManager) initiates a database synchronization (DBSynch) process. In one exemplary implementation of the present invention, the DBSynch process is a program that executes the transfer of data within the remote site. It compares the production database to the update database, copies the production database to a rollback database, determines the changes to be made to the production database, generates the structured query language (SQL) commands needed to make the changes, and executes the SQL commands.

In step 540 the cache is reloaded including new information.

Transactions are permitted to resume in step 550. In one embodiment of the present invention, a determination is made if changes were made properly. If changes were not made properly the method automatically rolls back to a prior version before permitting transactions to resume. A rollback copy provides a fault tolerance measure and to allow the user to change back to a previous version of the production database if so desired. In one embodiment of the present invention, a version information table (e.g., see FIG. 12) is provided that keeps track of previous versions that have been run and the data source to use for the roll back operations. In one exemplary implementation there is the ability to perform a plurality of rollbacks to a number of prior versions.

Also, the present invention generates tables which verify in detail whether the update was successfully implemented.

Figure 6:
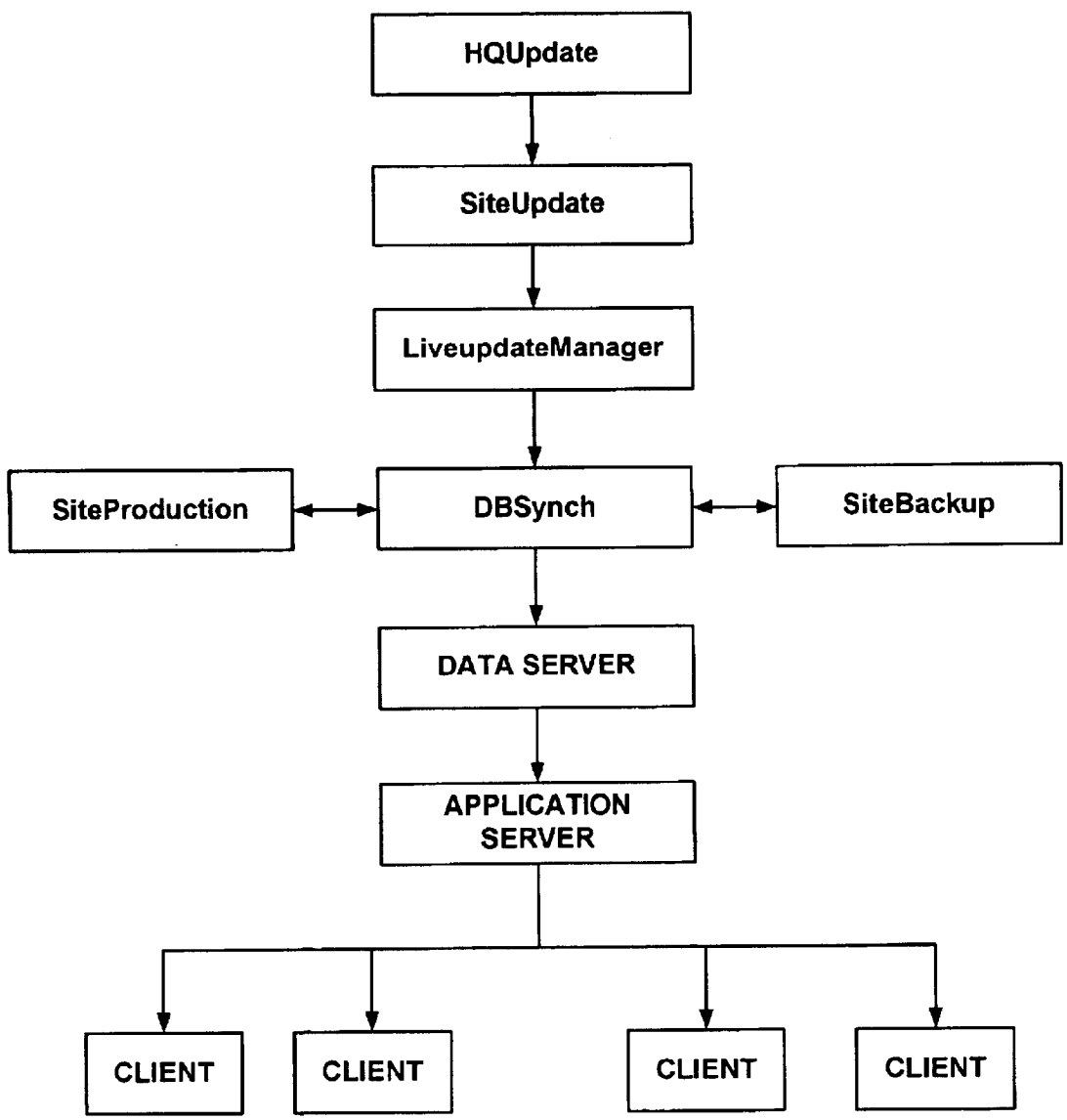
FIG. 6 is a block diagram illustrating the flow of information at a remote site in accordance with one embodiment of the present invention.

FIG. 6 is a block diagram of the flow of information in one embodiment of central database update process 300. The information first flows into a site update database and the remote management component begins initial update processing such as making a site backup and directing the transactions to enter a hold state in which new transactions are prevented from beginning. After the initial preparations are complete the remote management component suspends transactions between the remote server and its clients, makes the update changes, and permits the transactions to resume.

Figure 7A:
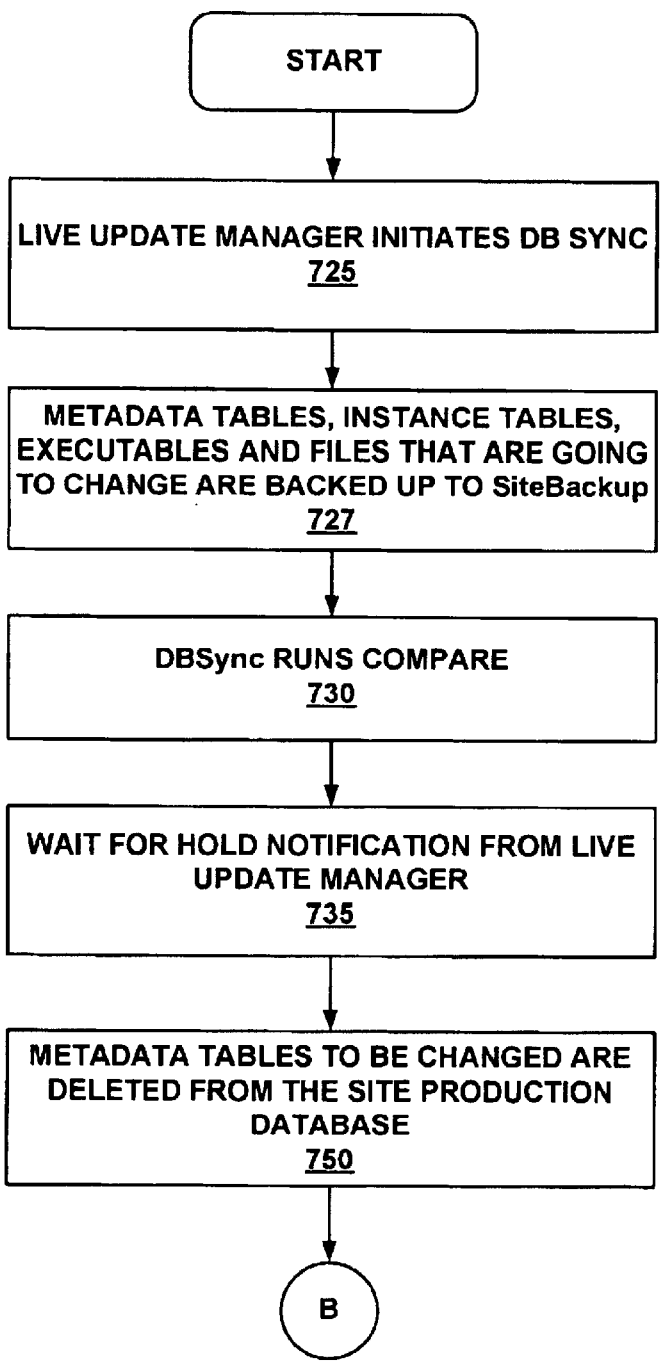
FIGS. 7A and 7B are flowcharts showing a sequence of events occurring at a remote site during a manufacturing database update in accordance with one embodiment of the present invention.
Figure 7B:
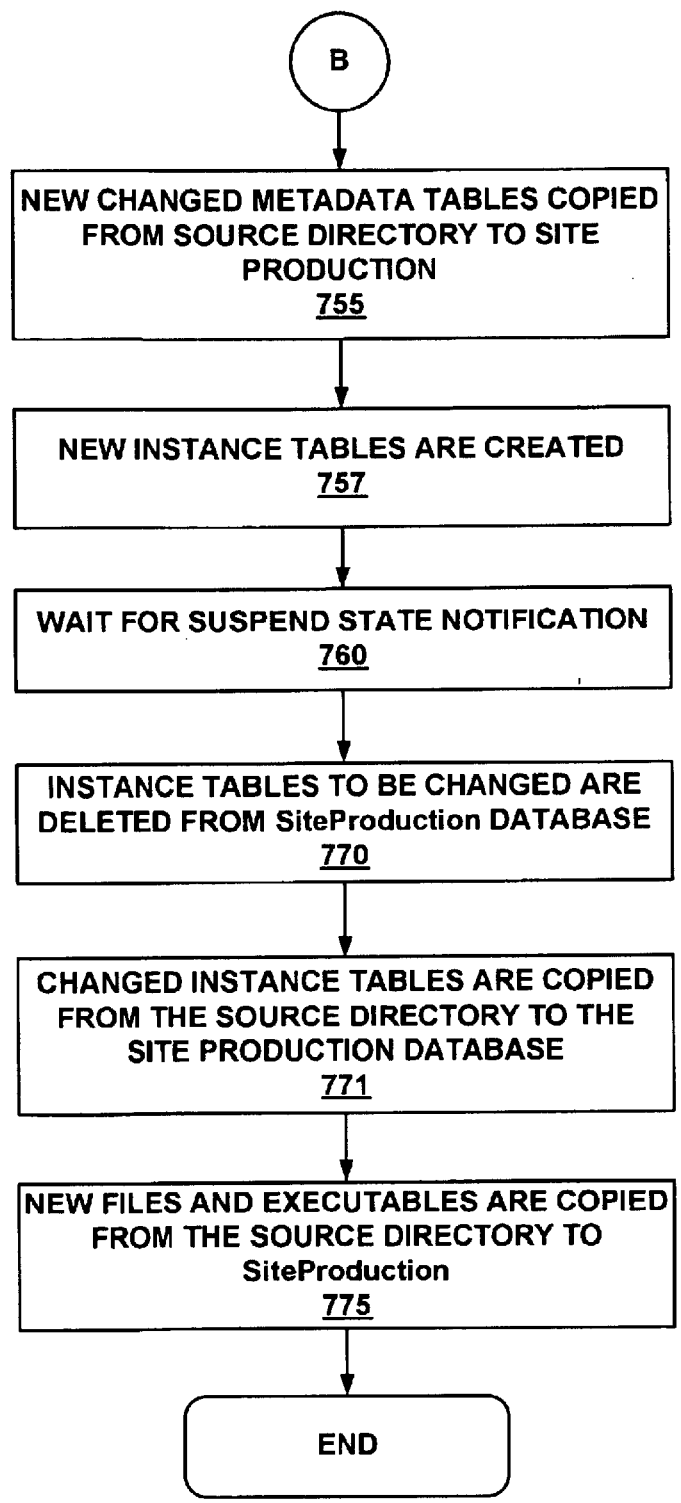

FIG. 7 is a flow chart of database synchronization process (DBSynch) 700, one embodiment of a present invention database synchronization process utilized in step 530 of FIG. 5.

In step 725 DBSynch process 700 is initiated by the remote manager (e.g., Live Update Manager).

In step 727 metadata tables, instance tables, executables and files that are going to change in the current update are backed up to the site backup database. For example, metadata tables that are listed to be changed in the control details table are copied before the changes are made from a site production database to a site backup database. The site backup database is available to provide previous configuration data if the user wants to revert to a previous database configuration. In one embodiment of the present invention, the site backup database is also used to automatically restore the database to a configuration before the remote update process started if the update is unsuccessful for any reason. The instance data tables that will be changed are listed in the control details table and are copied from the site production database to the site backup database by a database copy program (e.g., DBCopy). The site backup database information can be used to restore the configuration of the database to a previous version.

In step 730 of FIG. 7, DBSynch 700 runs a database compare process (DBCompare). In one exemplary implementation of the present invention, DBCompare is a program that reads information in a control details database table (FIG. 11A) and generates a change list. This change list is written to an update details database (FIG. 8B) and compared to the control details database. If the comparable fields in the two databases are identical, the update is allowed to continue, if not, the process is aborted.

In step 735, DBSynch 700 wafts for a hold state confirmation. In one embodiment of the present invention, the confirmation is sent by a remote update management component (e.g., LiveUpdateManager). Until the confirmation is received by DBSynch 700, no further steps are initiated to update the remote site. In one exemplary implementation of the present invention, the number and complexity of tasks performed by the remote update management component are limited reducing the probability of faults associated with complicated process.

In step 750 of FIG. 7, the metadata tables that are to be changed are deleted from the site production database by a database delete program (e.g., DBDelete).

In step 755, the new metadata tables are copied from the source directory to the site production database. In one embodiment of the present invention, new executions are inserted and modeling records are updated.

In step 757, DBSynch 700 creates new instance tables. In one embodiment of the present invention, the new instance tables include data that is entirely new to the present database. These tables can be created at this point because they are not accessed by the current production configuration. In one exemplary implementation they are created by a database update program (e.g., DBUpdate).

In step 760, DBSynch 700 waits for notification of the suspend state from the remote site update management component (e.g., LiveUpdateManager) and no further steps in the update will occur until notification is received. When the system enters the suspend state, the server at the remote site is unavailable to handle transactions with its clients. In one embodiment of the present invention, this suspend state can be completed in five minutes or less. It is important to note that while transactions between the remoter server and its clients are suspended the remote server is not disconnected from its clients. For example, manufacturing operations are not shut down, and there is no need for extensive shut down and start up procedures.

In step 770, the instance tables to be changed are deleted from the site production database by the database delete program (e.g., DBDelete).

In step 775 of FIG. 7, the new changed instance tables (e.g., changed instance tables) are copied from the source directory to the site production database. At this point, the present invention generates a local control table (e.g., FIG. 9) and an update feedback table (e.g., FIG. 10). The local control table includes a record for each individual table that has changed in the update. In one exemplary implementation it includes a version number of the table and an indication whether the update succeeded or failed. The update feedback table includes similar information about the database as a whole as well as generating an error string for any updates that were unsuccessful.

In step 775 new files and executables are copied from the source directory to the site production database.

In one embodiment of the present invention, provisions are made to facilitate user addition of steps in database synchronization process (DBSynch) 700. In one exemplary implementation of the present invention a user is permitted to add a script or batch files.

Thus, in accordance with the present invention, changes to a manufacturing database are made from a central location and sent to remote manufacturing sites. The present invention provides a method of automatically updating remote manufacturing databases from a central location. It performs these updates quickly and the downtime at the remote site is minimized while the update is occurring. A rollback copy is made as a fault tolerance measure and to allow the user to change back to a previous version of the production database if so desired. Also, the present invention generates tables which verify in detail whether the update was successfully implemented. The present invention enables manufacturers to use a single group of programmers at a central location to create the production models for numerous production sites thereby facilitating reduce labor costs and enhancing standardization of techniques.

The preferred embodiment of the present invention, a method of performing a live update of a manufacturing database, is thus described. While the present invention has been described in particular embodiments, it should be appreciated that the present invention should not be construed as limited by such embodiments, but rather construed according to the below claims.

What is claimed is:

1. A method for performing an automatic configuration of a remote manufacturing database comprising the steps of:
   a) preparing centralized update information;
   b) presenting said update information for export to a remote location;
   c) making remote preparations for an update;
   d) updating a remote database in a server at said remote location, wherein said updating includes providing said centralized update information; and e) running a database compare process;

f) waiting for a hold state confirmation; and g) creating new instance tables.

2. The method of claim 1, wherein transactions continue between said remote server and its clients while said remote preparations for an update are made.

3. The method of claim 1, wherein transaction between said remote server and said clients are suspended while said remote database is updated and a network connection between said client and said server is maintained.

4. The method of claim 1, wherein a copy of a previous configuration is retained at said remote site.

5. The method of claim 1, wherein a time-stamped record is kept, said record detailing the success or failure of completing said updating of said remote database.

6. The method of claim 1, wherein said centralized update information includes configuration information which is an update to a previous configuration.

7. The method of claim 6, wherein said configuration is a new configuration.

8. A computer-usable medium having computer-readable program code embodied therein for causing a computer system to perform the steps of:

a) preparing centralized update information;

b) presenting said update information for export to a remote location;

c) making remote preparations for an update;

d) updating a remote database in a server at said remote location, wherein said updating includes providing said centralized update information; and e) running a database compare process;

f) waiting for a hold state confirmation; and g) creating new instance tables.

9. The computer-usable medium of claim 8, wherein the computer readable program directs the computer system to make remote preparations for an update while existing transactions continue between said remote server and its clients.

10. The computer-usable medium of claim 8, wherein the computer readable program directs the computer system to suspend transactions between said remote server and said clients while said remote database is updated and directs a network to maintain a connection between said client and said server during said update.

11. The computer-usable medium of claim 8, wherein the computer readable program directs the computer system to retain a copy of a previous configuration at said remote site.

12. The computer-usable medium of claim 8, wherein the computer readable program directs the computer system to keep a time-stamped record, said record detailing the success or failure of completing said updating of said remote database.

13. The computer-usable medium of claim 8, wherein said centralized update information includes configuration information which is an update to a previous configuration.

14. The computer-usable medium of claim 8, wherein said configuration is a new configuration.

15. A computer system comprising:

a bus for communicating information;

a computer storage medium coupled to said bus, said computer storage medium operable to store digital information and computer-readable program code, wherein said computer-readable program code causes a computer system to perform the steps of:

a) preparing centralized update information, b) presenting said update information for export to a remote location, c) making remote preparations for an update, and d) updating a remote database in a server at said remote location, wherein said updating includes providing said centralized update information; and a central processor unit coupled to said bus operable to process digital information and instructions, including performance of a database synchronization process comprising:

running a database compare process;

waiting for a hold state confirmation; and creating new instance tables.

16. The computer system of claim 15 wherein a backup copy of a previous version of said remote database is maintained.

17. The computer system of claim 16 wherein said synchronization process includes the steps of:

backing up unchanged versions of metadata tables scheduled to be changed in the current update;

deleting the metadata tables that are to be changed from the site production database by a database delete program; and copying the new metadata tables from the source directory to the site production database.

18. The computer system of claim 16 wherein said synchronization process includes the steps of:

waiting for notification of the suspend state;

backing up changed instance tables to the site backup database;

deleting the changed instance tables from the site production database by the database delete program; and copying the new instance tables from the source directory to the site production database.

* * * * *